United States Patent [19]

Myers et al.

[11] Patent Number: 5,409,114
[45] Date of Patent: Apr. 25, 1995

[54] PACKAGE AND METHOD FOR PACKAGING ROLLS OF WEB

[75] Inventors: Kathleen L. Myers; Howard D. Cook, both of Rochester; Richard P. Garnsey, Fairport; Diane E. Parke-Potter, Rochester, all of N.Y.

[73] Assignee: Eastman Kodak Company, Rochester, N.Y.

[21] Appl. No.: 139,383

[22] Filed: Oct. 19, 1993

[51] Int. Cl.⁶ .................................... B65D 85/66
[52] U.S. Cl. ........................................ 206/394
[58] Field of Search ........................ 206/394, 391

[56] References Cited

U.S. PATENT DOCUMENTS

| | | | |
|---|---|---|---|
| 1,365,659 | 1/1921 | Carter | 206/397 |
| 1,898,857 | 2/1933 | Theiss | 206/410 |
| 2,335,766 | 11/1943 | Kinloch | 206/403 |
| 2,424,553 | 7/1947 | Conti | 206/394 |
| 3,280,987 | 10/1966 | Steinbock | 211/59 |
| 3,532,210 | 10/1970 | Minion et al. | 206/408 |
| 4,058,216 | 11/1977 | Tsuyuguchi | 206/597 |
| 4,079,835 | 3/1978 | Kendig | 206/416 |
| 4,114,655 | 9/1978 | Bloker | 138/89 |
| 4,122,949 | 10/1978 | Blatt | 206/394 X |
| 4,553,668 | 11/1985 | James et al. | 206/391 |
| 4,570,794 | 2/1986 | Capitao, Jr. | 206/394 |
| 4,708,246 | 11/1987 | Minion | 206/394 |
| 4,715,500 | 12/1987 | Heylen et al. | 206/397 |
| 4,760,915 | 8/1988 | Boets et al. | 206/303 |
| 4,792,044 | 12/1988 | Nishizawa et al. | 206/394 |
| 4,845,920 | 7/1989 | Lancaster | 53/399 |
| 4,955,471 | 9/1990 | Hirose et al. | 206/303 |
| 4,998,619 | 3/1991 | Sowa et al. | 206/392 |
| 5,114,012 | 5/1992 | Mushinski et al. | 206/523 |
| 5,163,556 | 11/1992 | Akao et al. | 206/394 |

FOREIGN PATENT DOCUMENTS 296689 12/1990 Japan ......................... 206/394

*Primary Examiner*—William I. Price
*Attorney, Agent, or Firm*—Carl F. Ruoff

[57] ABSTRACT

A package (10) enclosing a stack of rolls (1) includes a carrying means (12), a first tray-like member (40) mounted on the carrying means (12) and a roll support member (14) for receiving and supporting the rolls (1) in a vertical stack. A moisture and light impervious member (16) is wrapped around the vertical stack with the top most roll (3) in the stack at least partially abutting the first closed end of the package (10). Means for opening and closing the first and second closed end portions are provided. In the preferred embodiment, overlapping flap portions (82,84) are formed and then sealed together via tape 30. A second tray-like member (42) is mounted onto the first closed end of the package (10) and the unitized package is wrapped with at least one strap (44) to secure the package (10) to the carrying means (12).

14 Claims, 5 Drawing Sheets

PACKAGE AND METHOD FOR PACKAGING ROLLS OF WEB

FIELD OF THE INVENTION

The invention relates to packages for rolls of web. More particularly, the invention concerns packages for storing and shipping rolls of photosensitive web, such as photographic paper.

BACKGROUND OF THE INVENTION

Presently bulk rolls of web, such as photographic paper, are generally individually wrapped and placed in light tight bags or pouches. As depicted in FIG. 1, typically rolls 1 of photographic paper are grouped together and then packaged. More particularly, the rolls 1 of photographic paper are placed in a corrugated tray 5 that is adhesively attached to a shipping pallet (not shown). The group of rolls 1 are then stretch wrapped (not illustrated). Finally, a two piece corrugated wrap 6 is used to enclose the stretch wrapped affair to reinforce the rolls 1 of photographic paper as well as to unitize the package. A corrugated top tray 7 is then placed over the completed wrap and the entire unitized package is enclosed in a second stretched wrap (not shown).

A shortcoming of existing packaging formats for bulk photographic web is that its construction involves excessive wrapping materials. For instance, the double stretch wrapped layers of existing packaging exasperates the problem of adding material to the waste disposal stream. Moreover, another problem with existing packaging for bulk rolls of photographic web is that the packaging arrangement contains less material per pallet than does the package of the invention. This shortcoming requires the customer, for example the photofinisher, to make more frequent paper supply changes. Thus, precess and equipment uptime are adversely affected. Moreover, existing packages are provided largely with non-recyclable materials surrounding the individual rolls of paper. Furthermore, it is important to photofinishing operations that the rolls of photosensitive paper enclosed in the package have cores that are compatible with the photographic paper dispenser, such as the one described in U.S. application Ser. No. 956,002, filed Nov. 23, 1992, and based on priority French application No. 9000007375, filed Jun. 8, 1990, which provides an external source of photographic paper to photoprinting equipment.

One attempt to address one or more of the above problems is disclosed in U.S. Pat. No. 5,163,556 by Akao et al. Akao teaches a package assembly of rollform photographic paper comprising a roll support member fixed to a pallet and a plastic pouch enclosing the stack and sealed at top end and tied around the perimeter of the package at the bottom end.

U.S. Pat. No. 4,760,915 to Boets discloses a package having rigid end plates a drum like enclosure surrounding the rolls. The end plates are locked to the pallet.

Despite the improvements represented by the above examples, there persists a need for a package for enclosing a stack of rolls of web that have individual cores that are compatible with the requirements of current photofinishing equipment, that is of simple construction, easy to use, economical to manufacture, recyclable and returnable while providing protection from light, moisture and shock incurred during shipping and handling.

SUMMARY OF THE INVENTION

For solving one or more of the above problems, there is provided, in one aspect of the invention, a package assembly for enclosing a group of objects each having a first central opening, the group having a top most object and a bottom most object, comprises a carrying means and an object support member for receiving and supporting the objects in a vertical group, the object support member having objects thereon being removably mounted to the carrying means. The object support member, moreover, passes through the first central opening of the objects. Also provided is a moisture and light impervious member having an open end for receiving the group of objects on the support member and a first closed end at least partially abutting the top most object in the group. The open end when enclosed about the group comprises an end portion extending outwardly from the bottom most object of the group. Means are provided for opening and closing the first and second end portions. In a preferred embodiment, the end portions are folded to form opposed overlapping flaps which are sealed to one another. The closed package therefore forms a unitized package. Finally, means for securing the unitized package to the carrying means is provided.

Another solution to one or more of the above problems is provided by a package enclosing a stack of rolls of photosensitive web, each roll having a first central opening and the stack having a top most and a bottom most roll, the package comprising the carrying means, support member and moisture and light impervious member, as described above. Moreover, the package of this embodiment includes interleaving disk members positioned between adjacent rolls of web for protecting the rolls from damage, the disk members each having a slit portion extending from a third central opening outwardly to a periphery edge of the disk member for easy insertion onto the support member between adjacent rolls and removal. Further included in this embodiment are first and second tray-like members. The first tray-like member is positioned between the carrying means and the second closed end of the unitized package. First tray-like member is conformed to fit partially around the second closed end, and the second tray-like member is conformed to fit partially around the first closed end of the unitized package. Also, a rigid paperboard enclosure member for protecting the unitized package is provided. The enclosure member has a first half portion and a second half portion, the first half portion having a first and second side edge and first top and first bottom end edges. The second half portion has third and fourth side edges and second top and second bottom end edges. Importantly, the first and second end edges are provided with first and second flap portions, respectively, extending lengthwise at least partially along the respective first and second end edge. First and second flap portions are adhered to the half portion of the other to form a protected unitized package. The first bottom edge and the second bottom edge are securely inserted in a first gap between a first periphery wall of the first tray-like member and the moisture and light impervious member. Similarly, the first top edge and second top edge are securely inserted in a second gap between a second periphery wall of the second tray-like member and the first closed end of the unitized package. The package also includes first and second shock resistant layers, the first shock resistant layer being positioned between the second tray-like member and the first closed end of the unitized package. The second shock resistant layer is positioned between the second closed end of the unitized package and the first tray-like member. The package is then secured to the carrying means by at least one strap wrapped securely around the carrying means and then longitudinally around the protected unitized package.

Yet another solution to one or more of the above problems is provided by a method of packaging rolls of web each having a first central opening in a vertical stack, comprising the step of providing the rolls of web for forming the stack, a carrying means, and a roll support member. Also provided are a moisture and light impervious member having an open end for receiving the rolls in a stack and a first closed end, and first and second tray-like members. The first tray-like member is then mounted onto the carrying means. After removing a mandrel from the rolls, a roll support member is then inserted into the first central opening of the rolls. The rolls are then enclosed in a light and moisture impervious member and then closed on both ends before being mounted onto the first tray-like member. A second tray-like member is then mounted onto the first closed end of the package. Finally, the package is secured by wrapping a strap longitudinally around the package and the carrying means.

BRIEF DESCRIPTION OF THE DRAWINGS

The foregoing as well of other objects, features and advantage of this invention will become more apparent from the appended Figures, wherein like reference numerals denote like elements, and wherein.

DETAILED DESCRIPTION OF THE INVENTION

Turning now to the drawings, and more particularly to FIGS. 2-5, there is shown package assembly 10 enclosing a group of objects, such as photosensitive web, constructed according to the principals of the invention. The objects or rolls 1 of photosensitive web most appropriately enclosed in the package 10 of the invention have individual first central openings 2 or cores.

Figure 1:
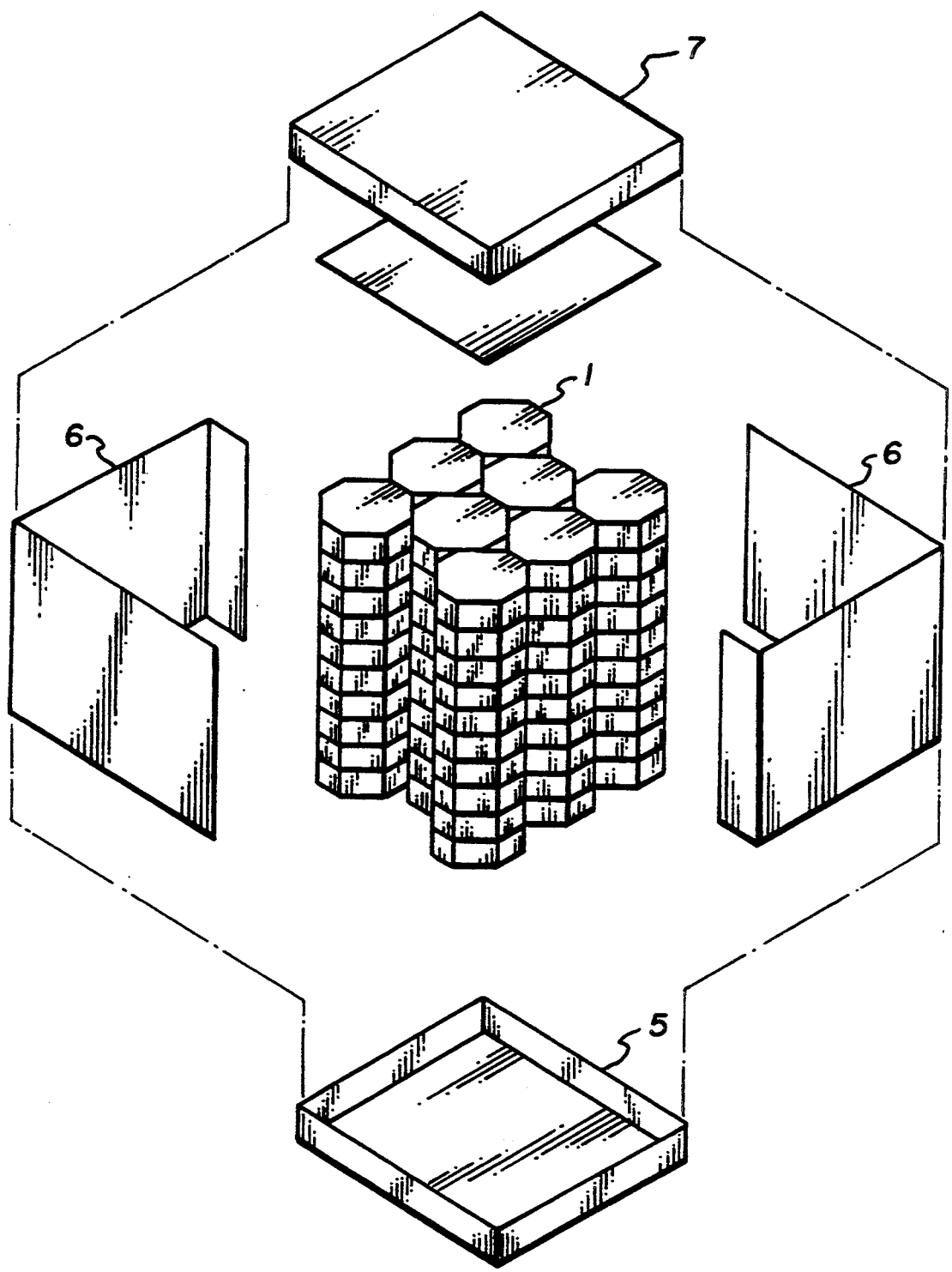
FIG. 1 is an exploded view of a prior art package for bulk rolls of web.
Figure 2:
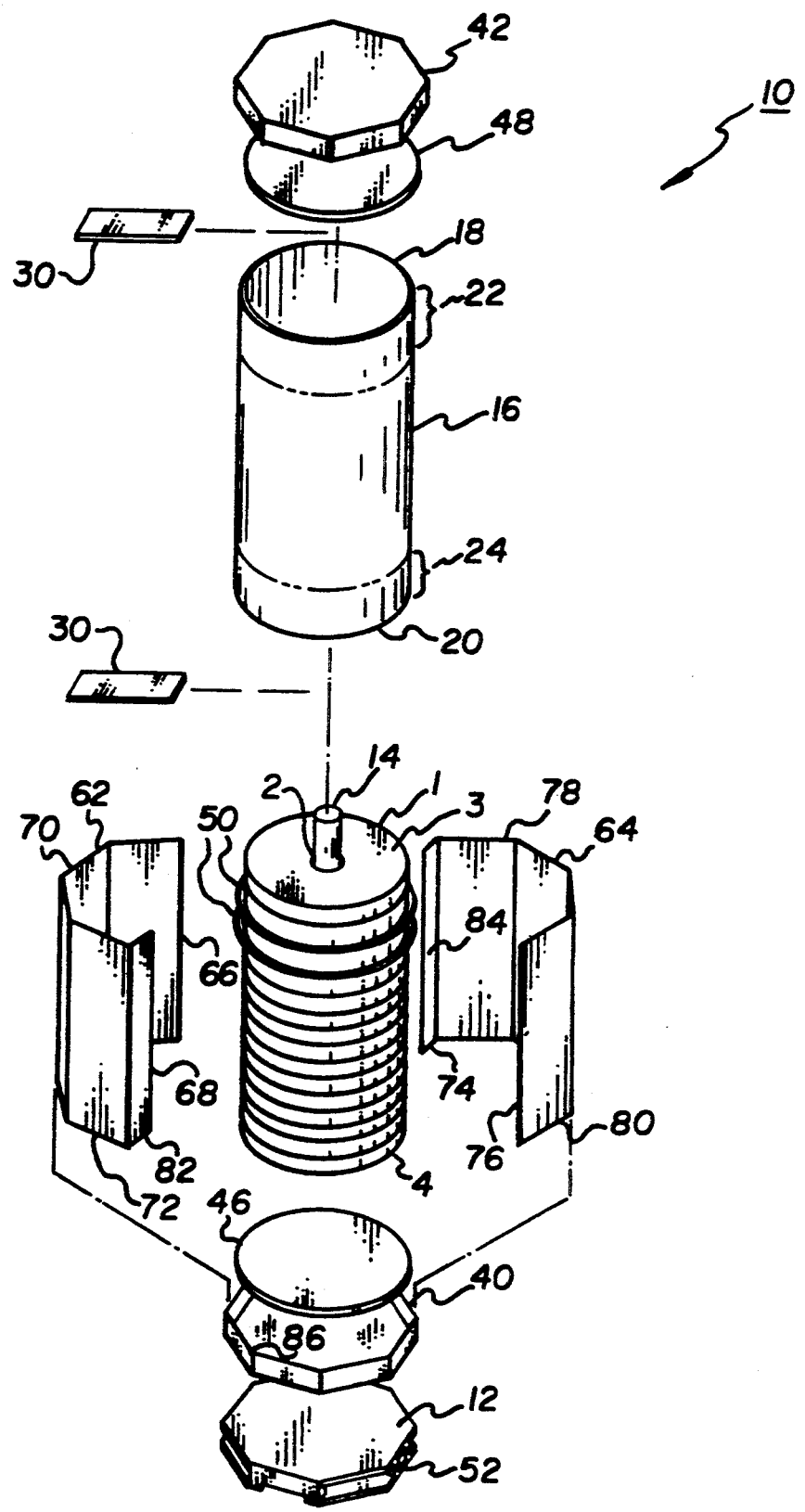
FIG. 2 is an exploded view of one embodiment of the package according to the principals of the invention.
Figure 3:
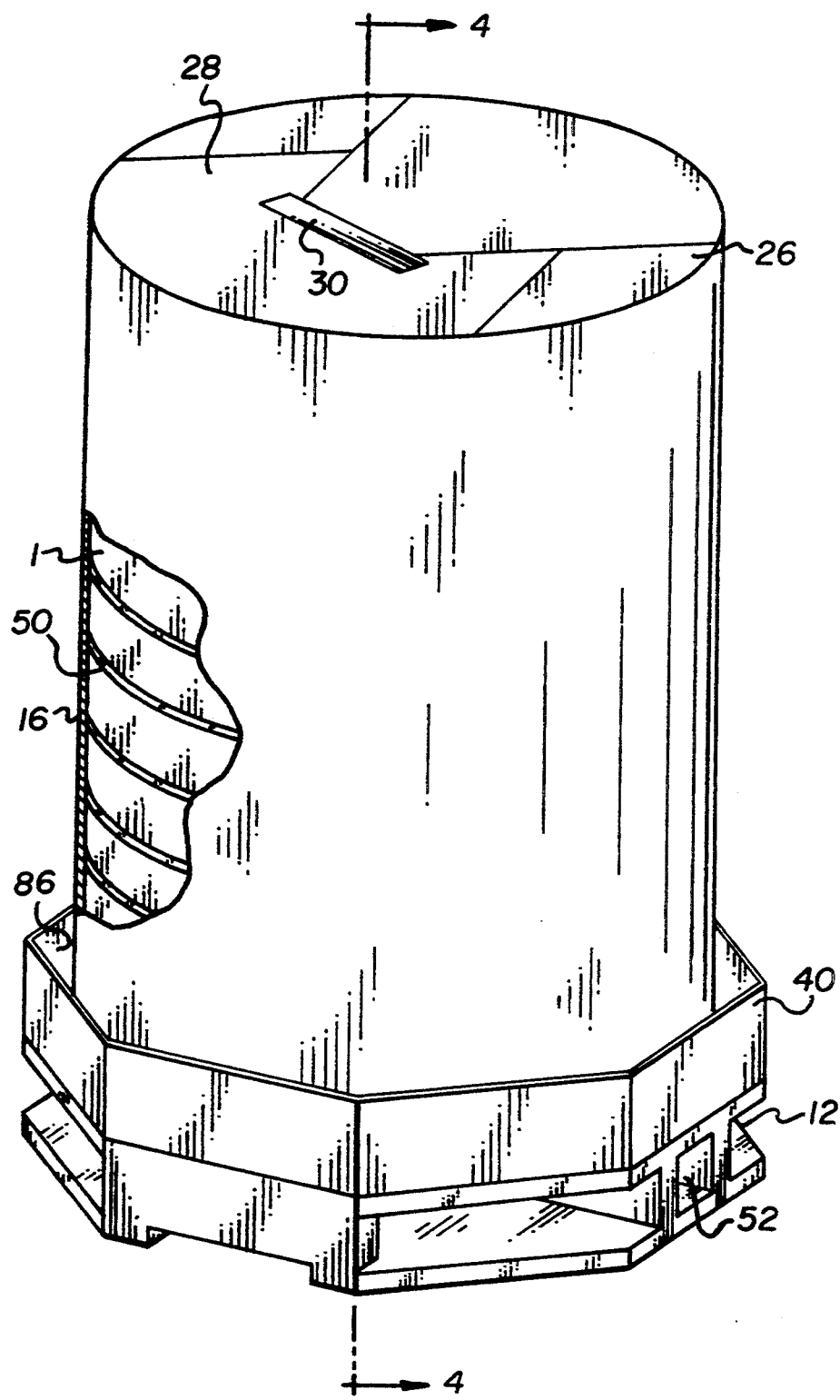
FIG. 3 is a perspective view of the package.
Figure 5:
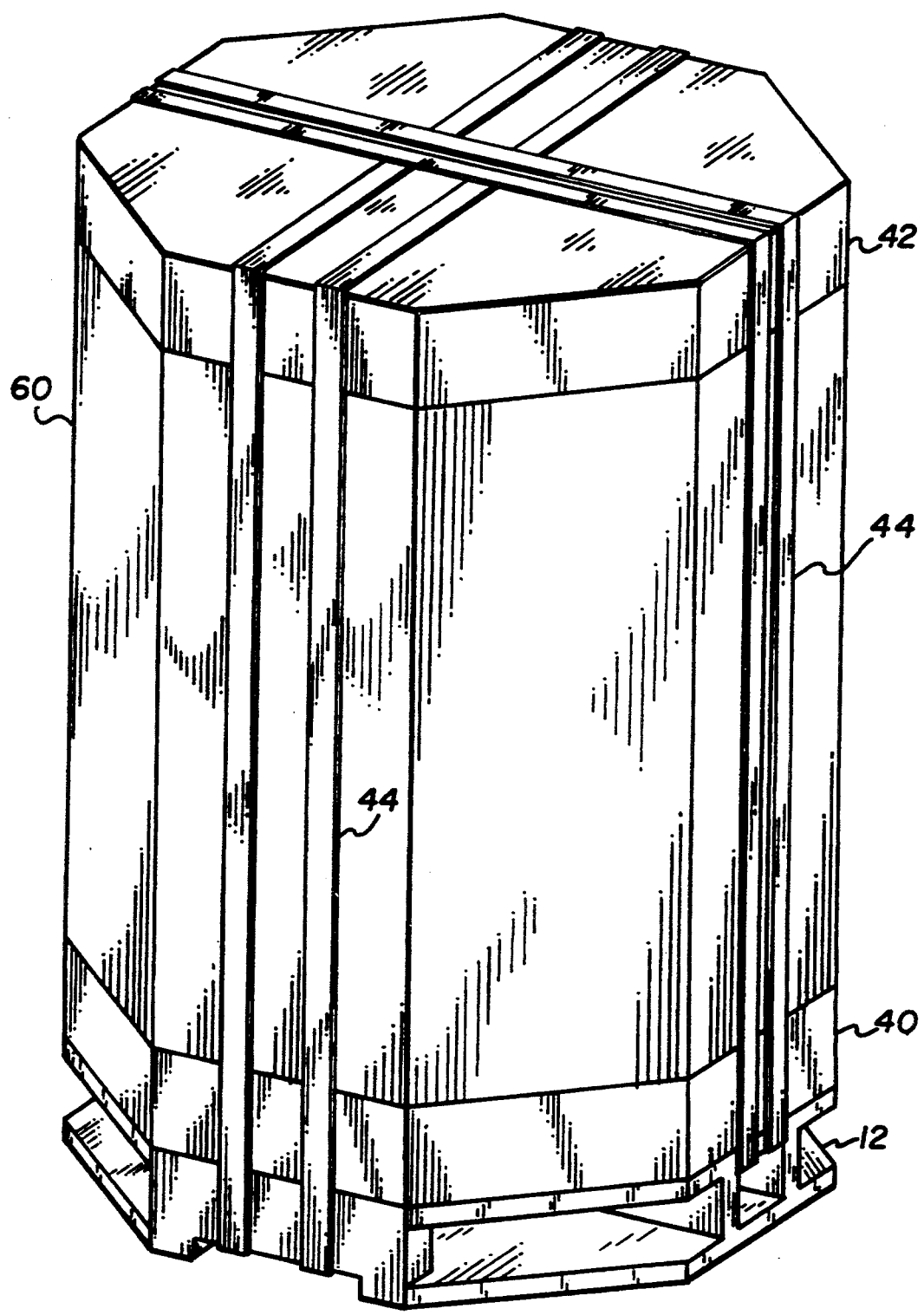
FIG. 5 is a perspective view of the strapped package.

Broadly defined, the package assembly 10 comprises a carrying means 12, an object or roll support member 14, a light and moisture impervious member 16 that protects the product from deleterious exposure, means for opening and closing the light and moisture impervious member 16 about the stack of objects or rolls 1, and means for securing the package 10 to the carrying means 12, each component being discussed in detail below. Carrying means 12, such as a pallet, serves as a primary transporting and storage vehicle. Moreover, the carrying means 12 also provides a means for securing the package 10, with for example straps, as described below. At least one through opening 52 is provided in the carrying means 12 to accommodate a strap for securing the package. In the preferred embodiment, the carrying means 12 is made of wood but, it also could be constructed of plastic or metal. Preferably, carrying means 12 has a generally octagonal shape as illustrated in FIGS. 2,3 and 5. The octagonal shape allows a close pack arrangement of multiple stacks of rolls 1 of photographic paper and, therefore, is an efficient way to conserve space.

Figure 4:
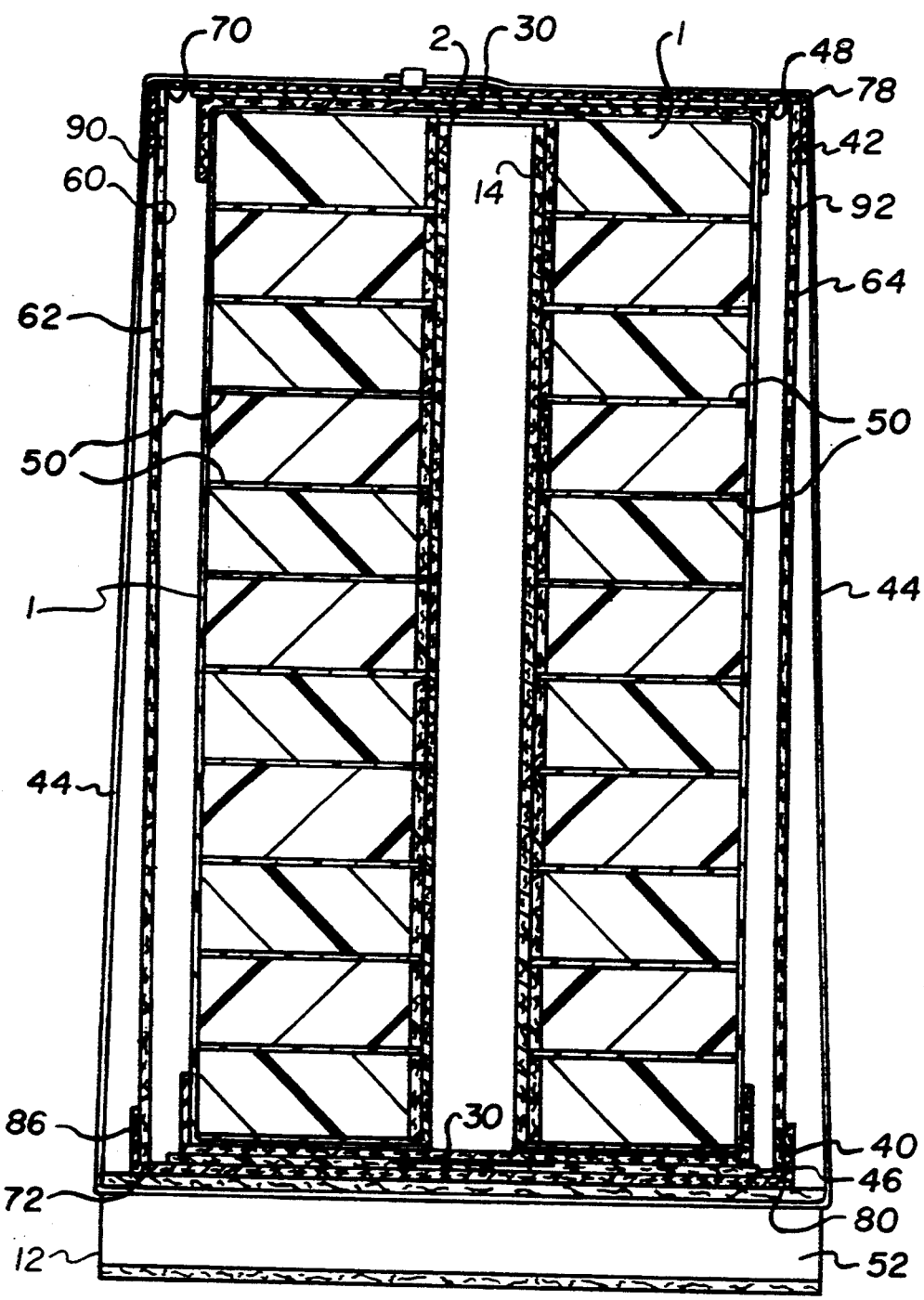
FIG. 4 is a section view along the 4—4 line of FIG. 3.

As depicted in FIG. 2 and 4, an object support member 14 for receiving and supporting at least one object or roll 1 in a vertical group or stack 3 is provided. The roll support member 14, which is preferably generally cylindrical, has a diameter slightly less than the diameter of the first central opening 2 in the objects or rolls 1. As best seen in Fig. 4, this enables the support member 14 to pass through the first central openings 2 of the objects or rolls 1. Roll support member 14 is preferably a solid member but, it may also have a central opening (not shown). When the rolls 1 are properly mounted on the roll support member 14, the support member 14 having rolls stacked thereon is removably mounted onto the carrying means 12. The stack of rolls 1 and centralized roll support member 14 passing through the cores provide adequate weight balance on the carrying means. Thus, the roll support member 14 maintains the integrity of the stacked rolls 1 by preventing shifting of the rolls 1.

Referring to FIGS. 3-5, to enable the rolls 1 of photosensitive web to be transported in light without adversely affecting the sensometric properties of the rolls of photosensitive paper, a moisture and light impervious member 16 or wrapping encloses the rolls 1 stacked on the roll support member 14. Accordingly, it is contemplated that moisture and light impervious member 16 comprise a material that is photographically inert, light shielding, highly abrasion resistant and highly puncture resistant. The material preferred by the inventors is a laminated material comprises of natural polyethylene, white paper, and black polyethylene manufactured by Van Leer Flexibles, Inc. of Houston, Texas. Alternative suitable materials which may be substituted for the above preferred material include light shielding L-LDPE resin inflation film, LLDPE/HDPE coextruded film, HDPE blown film, spiral cut HDPE laminated film, multi-layer laminate film composed of various polyolefin resins or ethylene copolymer resins. According to FIG. 2, the light and moisture impervious member 16 has first and second open ends 18, 20 for receiving the stack rolls of photographic paper on the roll support member 14. When enclosed around the stack 3 of rolls 1, the moisture and light impervious member 16 comprises a first end portion 22 that extends outwardly beyond the top most object or roll 3 in the stack. As described below, the extended first end portion 22 is provided with means for opening and closing. Preferably, the first end portion 22 is folded to form overlapping first end flaps 26 and second flaps 28. Similarly, a second end portion 24 of moisture and light impervious member 16 extends beyond the bottom most object or roll 4 in the group or stack. Second end portion 24 is likewise provided with means for opening and closing about the stack. Both first and second end flaps 26,28 are secured to the respective ends of the stack by preferably an adhesive tape 30. Skilled artisans will appreciate that there are other ways of closing one or both of the end portions 22,24, such as tying the end portion and then inserting the tied portion into a central opening of the roll support member 14 (not illustrated). Once the package 10 is closed on both ends, as described above, a unitized package is formed.

Illustrated in FIGS. 2-5, an alternative embodiment of the invention comprises first and second tray-like members 40,42 positioned on opposite ends of the package 10 before the package 10 are securely strapped about the carrying means 12. First tray-like member 40 is positioned between the carrying means 12 and the second closed end 24 of the unitized package. First tray-like member 40 provides a base support for the stacked rolls of web mounted on the roll support member 14 and is conformed to fit partially around the unitized package. Second tray-like member 42 is positioned atop the unitized package. The tray-like members 40,42 are preferably made of corrugated paperboard but, they may be constructed out of other suitable materials, such as plastics. Preferably, first and second tray-like members 40,42 are substantially octagonally shaped to accommodate maximum storage of packaged stacks of rolls.

As depicted in FIGS. 2 and 4, first and second shock resistant layers 46,48 are used in an alternative embodiment of the package assembly 10 to provide protection from vibrations and other handling shock. Preferably a double walled corrugated paperboard is used as the shock resistant material. The first shock resistant layer 46 is positioned between the first tray-like member 40 and the second closed end of the unitized package. The second shock resistant layer is positioned between the second closed end of the unitized package and the second tray-like member 42.

In FIGS. 2-4, spacer layers 50 are positioned on the roll support member 14 between adjacent rolls of photographic paper in the stack. Preferably, spacer layer 50 comprises an interleaving disk member having a central opening and a slit portion extending from the central opening to a periphery edge of the disk member (not shown) for easily fitting around the roll support member 14. The spacers 50 provide protection against edge abrasion and turned edges. The spacers 50 also impart integrity to the stack of rolls by preventing rotation of the rolls during transit and handling.

As shown in FIG. 5, a rigid paperboard enclosure member 60 surrounds the stacked rolls 1 of photographic paper. Enclosure member 60 provides protection for the unitized package. As best seen in FIG. 2, enclosure 60 comprises first and second half portions 62,64, each having first and second side edges 66,68 and 74,76, respectively. First and second flap portions 82,84, respectively, extend lengthwise along the respective side edge 68,74 for adhesively attaching to the half portion of the other. In this way, the half portions 62,64 form enclosure 60 when enclosed around the unitized package. Also, first half portion 62 of enclosure 60 comprises first top and bottom edges 70,72; and, second half portion 64 comprises second top and bottom edges 78,80. To secure the enclosure 60 to an alternative embodiment of the package assembly 10, the first and second bottom edges 72, 80 are inserted in a first gap formed between inside lip 86 of the first tray-lite member 40, and the light and moisture impervious member 16 Similarly, the first and second top edges 70,78 are inserted in a second gap formed between inside lip 90 of the second tray-lite member 42 and light and moisture impervious member 16.

Referring to FIG. 5, at least one strap 44 is wrapped around the package 10 to secure the rolls to the carrying means 12. In the preferred embodiment, a plurality of straps 44 are wrapped around the various sides of the octagonally shaped package 10 to provide maximum security in transport and handling.

Accordingly, important advantages of the foregoing invention are that it provides a package and method for enclosing a stack of rolls of web that have individual cores that are compatible with the requirements of current photofinishing equipment, that is of simple construction, easy to use, economical to manufacture, recyclable and returnable while providing protection from light, moisture and shock incurred during shipping and handling.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes for exemplification, but is to be limited only by the scope of the attached claim or claims, including the full range of equivalency to which each element thereof is entitled.

What we claim is:

1. A package assembly enclosing a group of objects each having a first central opening, said group having a top most object and a bottom most object, the package comprising:

a carrying means;

an object support member for receiving and supporting the objects in a vertical group, said object support member having objects thereon being removably mounted to said carrying means, and wherein said object support member passes through said first central opening of the group of objects;

a moisture and light impervious member having first and second open ends for receiving the group of objects on said support member, said moisture and light impervious member when enclosed around the group comprises a first end portion extending outwardly beyond said top most object in the group and a second end portion extending outwardly beyond said bottom most object in the group;

means for opening and closing said first and second end portions, said end portions when closed defining a unitized package;

a rigid paperboard enclosure member for protecting said unitized package, said enclosure member having a first half portion and a second half portion, said first half portion having a first and second side edge and first top and first bottom end edges, and said second half portion having third and forth side edges and second top and second bottom end edges, and wherein said first and second end edges are provided with first and second flap portions extending lengthwise at least partially along the respective first and second end edge, said first and second flap portions being adhered to the half portion of the other to form a protected unitized package and, wherein said first bottom edge and said second bottom edge being securely inserted in a first gap between a first periphery wall of a first tray-like member and said moisture and light impervious member, and said first top edge and said second top edge being securely inserted in a second gap between a second periphery wall of a second tray-like member and said first closed end of said unitized package; and, means for securing said unitized package to said carrying means.

2. The package recited in claim 1 wherein said opening and closing means comprises said first end portion being folded inwardly towards said top most object to form opposed overlapping first end flaps, said opposed first end flaps being further sealed to one another thereby forming a first closed end, and said second end portion being folded inwardly toward the bottom most object to form opposed overlapping second end flaps, said opposed second end flaps being sealed to one another thereby forming a second closed end.

3. The package recited in claim 1 wherein said first tray-like member is positioned between said carrying means and said second closed end of said unitized package, said first tray-like member being conformed to fit partially around said second closed end of said unitized package and, said second tray-like member conforms to fit partially around said first closed end of said unitized package.

4. The package recited in claim 1 wherein said securing means comprises at least one strap longitudinally encircling said package securing said unitized package to said carrying means.

5. The package recited in claim 3 further comprising a first and second shock resistant layer, said first shock resistant layer being positioned between said first tray-like member and said second closed end of said unitized package, and said second shock resistant layer being positioned between said first closed end of said unitized package and said second tray-like member.

6. The package recited in claim 5 wherein said shock resistant layer comprises a double layer corrugated paperboard.

7. The package recited in claim 1 further comprising a spacer layer mounted on said object support member between adjacent objects in said vertical group.

8. The package recited in claim 7 wherein said spacer layer comprises an extruded polyethylene foam material.

9. The package recited in claim 1 wherein said carrying means comprises at least one through opening for routing said strap therethrough.

10. The package recited in claim 1 wherein the carrying means is octagonally shaped.

11. The package recited in claim 1 wherein said first and second tray-like end members are octagonally shaped.

12. A package enclosing a stack of rolls of photosensitive web each roll having a first central opening, said stack having a top most and a bottom most roll, the package comprising:

a carrying means;

a roll support member for receiving and supporting the rolls of photosensitive web in a vertical stack, said roll support member having rolls of photosensitive web thereon being removably mounted to said carrying means, and wherein said roll support member passes through said first central openings of said rolls;

a moisture and light impervious member having first and second open ends for receiving the stack of rolls on said support member, said moisture and light impervious member when enclosed around the stack comprises a first end portion extending outwardly beyond said top most roll in the stack and a second end portion extending outwardly beyond said bottom most roll in the stack, said first end portion being folded inwardly towards said top most roll to form opposed overlapping first end flaps, said opposed first end flaps being sealed to one another thereby forming a first closed end, and said second end portion being folded inwardly toward the bottom most roll to form opposed overlapping second end flaps, said opposed second end flaps being sealed to one another thereby forming a second closed end, wherein said first and second closed ends define a unitized package;

interleaving disk members positioned between adjacent rolls of web for protecting said rolls from damage, said disk members each having a slit portion extending from a third central opening outwardly to a periphery edge of the disk member for easy insertion onto the support member between adjacent rolls and removal;

first and second tray-like members, said first tray-like member positioned between said carrying means and said second closed end of said unitized package, said first tray-like member being conformed to fit partially around said second closed end, and said second tray-like member conformed to fit partially around said first closed end of said unitized package;

a rigid paperboard enclosure member for protecting said unitized package, said enclosure member having a first half portion and a second half portion, said first half portion having a first and second side edge and first top and first bottom end edges, and said second half portion having third and forth side edges and, second top and second bottom end edges, and wherein said first and second end edges are provided with first and second flap portions, respectively, extending lengthwise at least partially along the respective first and second end edge, said first and second flap portions being adhered to the half portion of the other to form a protected unitized package and, wherein said first bottom edge and said second bottom edge being securely inserted in a first gap between a first periphery wall of said first tray-like member and said moisture and light impervious member, and said first top edge and said second top edge being securely inserted between in a second gap between a second periphery wall of said second tray-like member and said first closed end of said unitized package;

a first and second shock resistant layer, said first shock resistant layer being positioned between said second tray-like member and said first closed end of said unitized package, and said second shock resistant layer being positioned between said second closed end of said unitized package and said first tray-like member; and, at least one strap wrapped securely around said carrying means and then longitudinally around said protected unitized package thereby securing said package during handling and shipping.

13. The package recited in claim 12 wherein said carrying means is octagonally shaped.

14. The package recited in claim 13 wherein said first and second end tray-like members are octagonally shaped.

* * * * *